Nov. 25, 1958  A. N. EMMONS  2,861,607
JACK SHAFT AND GUARD UNIT FOR WOOD WORKING SAWS
Filed Oct. 24, 1955  4 Sheets-Sheet 1

INVENTOR.
Arthur N. Emmons
BY
D. Emmett Thompson
ATTORNEY.

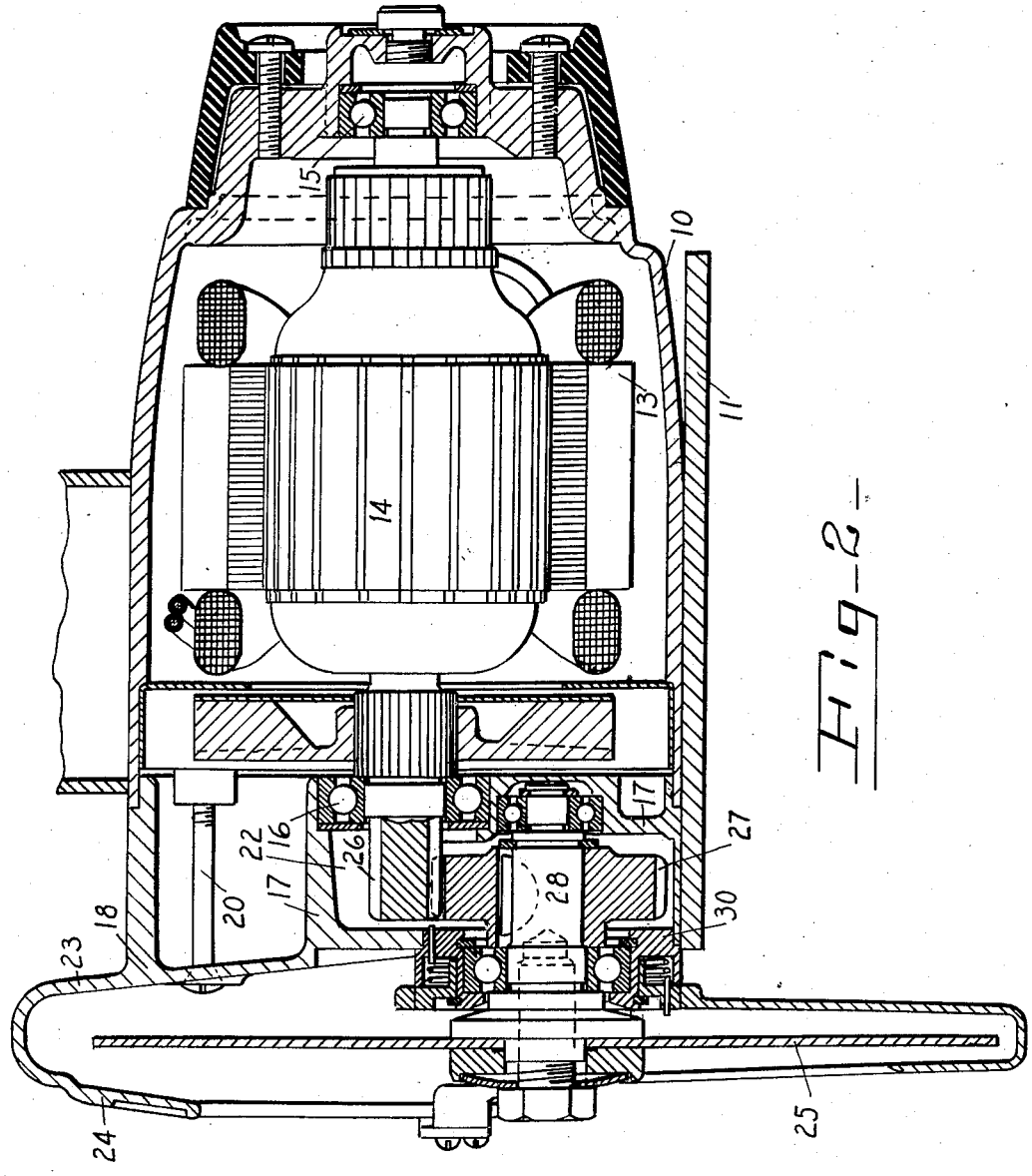

Nov. 25, 1958  A. N. EMMONS  2,861,607
JACK SHAFT AND GUARD UNIT FOR WOOD WORKING SAWS
Filed Oct. 24, 1955  4 Sheets-Sheet 3
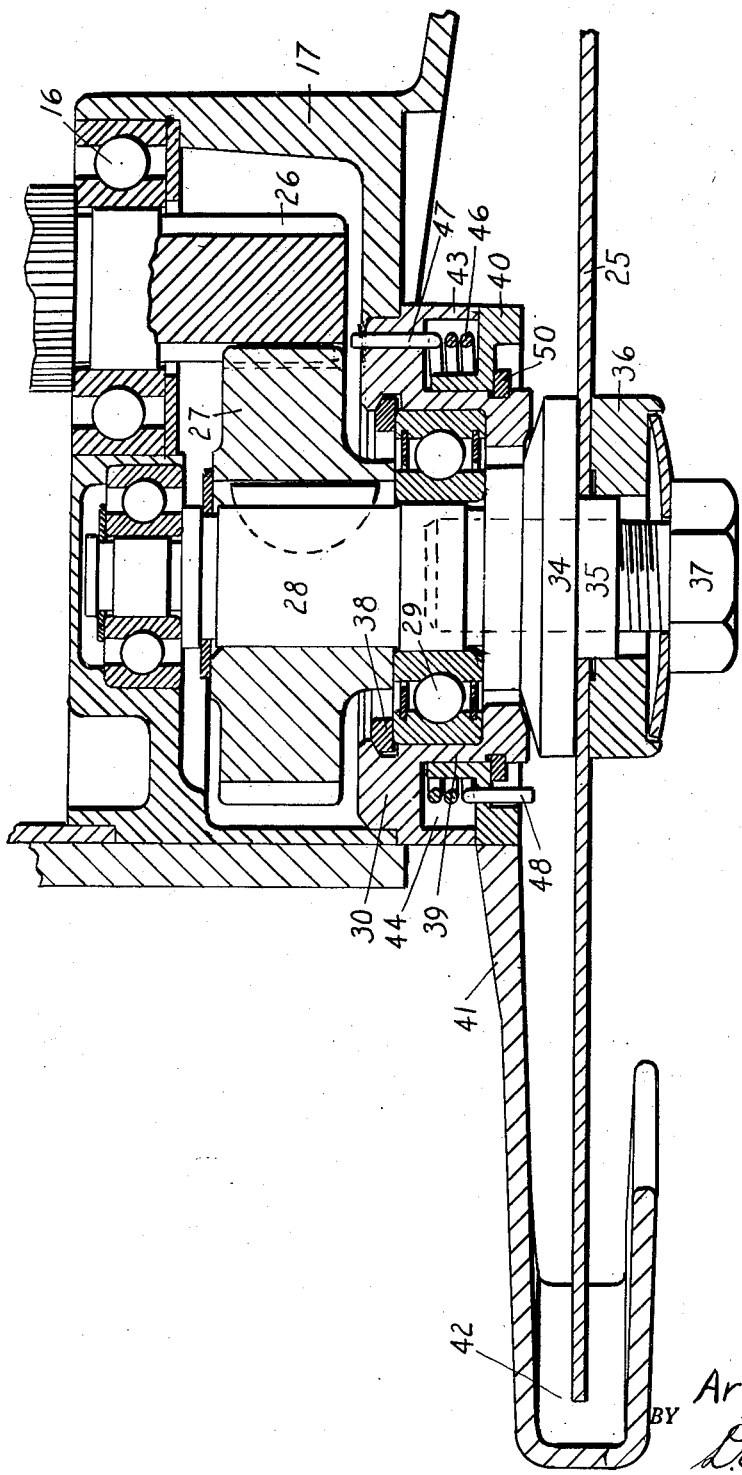
Fig-3-
INVENTOR.
Arthur N. Emmons
BY
D. Emmett Thompson
ATTORNEY.

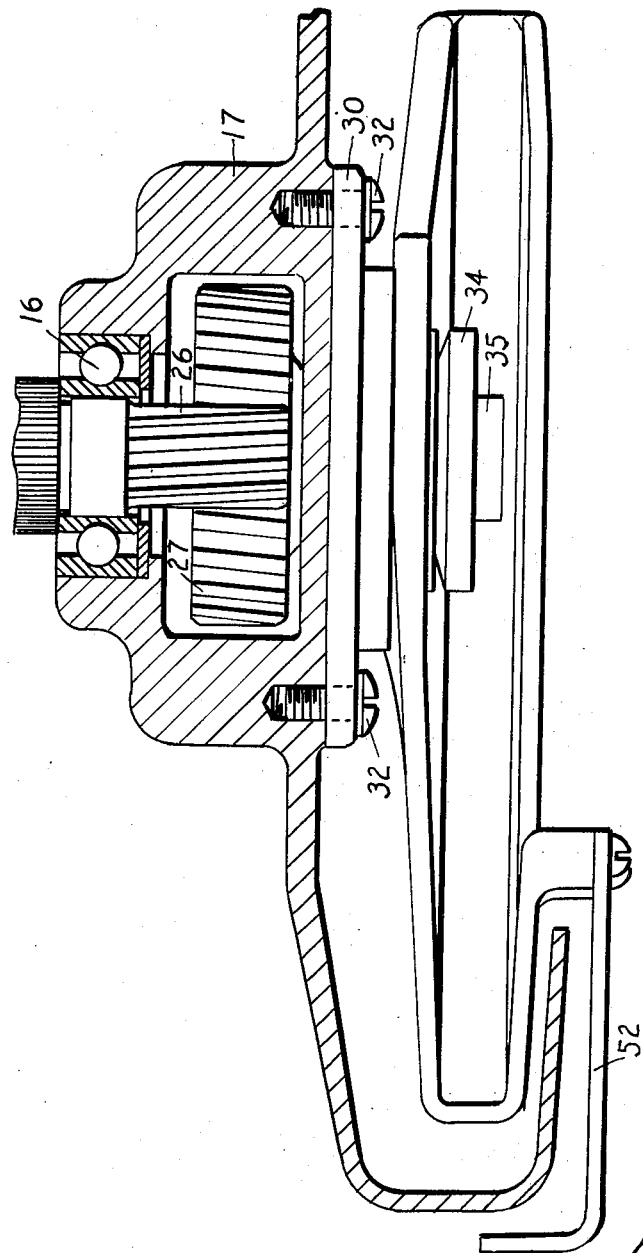

United States Patent Office 2,861,607
Patented Nov. 25, 1958

2,861,607

JACK SHAFT AND GUARD UNIT FOR WOOD WORKING SAWS

Arthur N. Emmons, Nedrow, N. Y., assignor to The Porter-Cable Machine Company, Syracuse, N. Y., a corporation of New York Application October 24, 1955, Serial No. 542,139

1 Claim. (Cl. 143—159)

This invention relates to power-operated sawing machines for sawing wood and which employ a circular saw blade. More particularly, the invention has to do with a guard and saw arbor unit for such machines, particularly of the portable hand type.

Portable, bodily manipulated, power operated, sawing machines have gone into very extensive use. In power saws of this type, the upper half portion of the circular saw blade is enclosed by a stationary or fixed guard. Because these machines are hand manipulated, it is extremely important to provide adequate guard protection to the lower portion of the blade. This is accomplished by using one of two forms of guards. The swing guard which is pivoted at its rear end to the machine housing and which, when engaged by the wood being cut, swings downwardly and rearwardly to expose the lower portion of the circular blade for the cutting operation. In the other form, the lower portion of the blade is covered by a guard which is movable about the axis of the blade. This guard is sometimes referred to as a telescoping guard in that it has to move upwardly into or over the fixed guard.

The telescoping form of guard has certain functional advantages over the swing type. Heretofore, in some instances, the telescoping guards were mounted for rotation on the outer wall of the upper fixed guard. This arrangement had certain inherent disadvantages and it is preferable that the telescoping guard be journalled on the motor housing of the machine—that is, on or in proximity to the inner wall of the upper fixed guard. However, in such arrangements, the mounting of the telescoping guard on the inner wall of the fixed guard, or the end wall of the machine housing, resulted in the arbor shaft projecting outwardly a considerable distance from the bearing in which it was journalled, whereby the arbor shaft was subjected to excessive torsional strains and overloading of the arbor bearing.

This invention has as an object a power-operated wood cutting saw of the character designated embodying a structural arrangement whereby the telescoping guard is mounted at the rear or inner side of the saw blade, with the main bearing of the arbor shaft rigidly supported and positioned in close proximity to the saw blade.

The invention has as a further object, a telescoping guard and jack shaft unit which can be readily and conveniently removed from the machine for repairs or lubrication, or the guard can be removed separately without disturbing the rest of the structure.

The invention consists in the novel features and in the combinations and constructions hereinafter set forth and claimed.

In describing this invention, reference is had to the accompaning drawings in which like characters designate corresponding parts in all the views.

In the drawings:

Figure 2 is a vertical sectional view corresponding to line 2—2, Figure 1.

Figure 3 is an enlarged vertical sectional view of the guard and arbor unit.

Figure 4 is a view taken on line 4—4, Figure 1.

Figure 1:
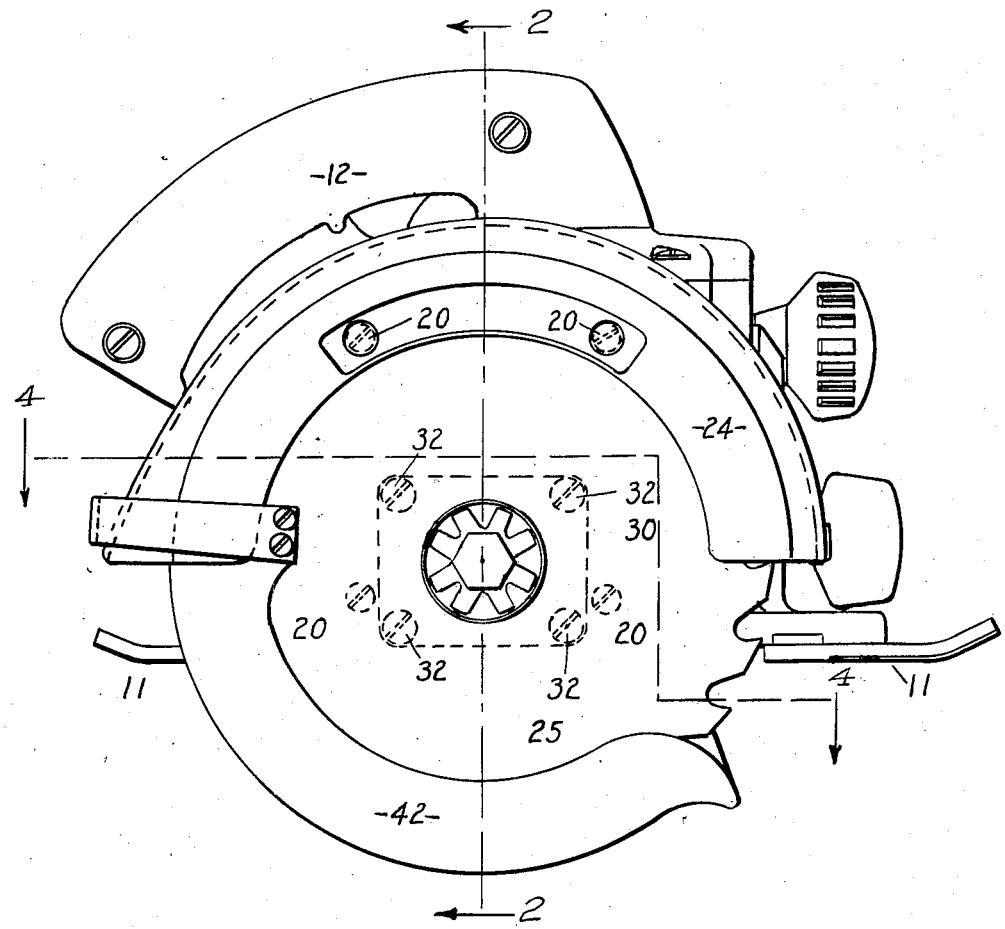
Figure 1 is a side elevational view of a saw embodying my invention.

The saw, shown in the drawings, is of the portable hand manipulated type and consists of a housing 10 secured to a base plate 11 and provided with a handle 12. The machine is powered by an electric motor 13 mounted in the housing 10 having the shaft of its armature 14 journalled in a bearing 15 mounted in one end wall of the housing and the opposite end of the armature shaft is mounted in a bearing 16 positioned in the hub portion 17 of a fixed guard 18 secured to the housing 10, as by screws 20, one of which is shown in Figure 2. The hub portion 17 of the guard is formed with a gear compartment 22 and with an arcuate shaped channel portion having inner and outer walls 23, 24, encircling the upper portion of the saw blade 25. The armature shaft projects into this compartment and is machined to form a pinion gear 26 which is arranged in mesh with a spur gear 27 keyed to the arbor shaft 28. The arbor shaft is journalled in a bearing 29, mounted in a bearing cap 30, which forms a closure for the gear compartment 22 and which is detachably secured to the hub portion 17 of the stationary guard, as by screws 32.

The arbor shaft 28 extends outwardly through a bearing 29 and cap 30 and is formed, contiguous to the bearing, with an integral collar portion 34 against which the saw blade 25 is clamped. The blade is positioned on a short circular portion 35 and is held between the collar 34 and an outer collar 36 by a clamp screw 37 threaded into the arbor.

The outer race of the bearing 29 is held positioned against a shoulder portion of the cap by a snap ring 38 detachably mounted in a groove formed in the bore of the cap member, see Figure 3. The cap 30 is formed with a cylindrical portion 39 encircling the bearing 29 and on which there is rotatably mounted a hub portion 40 of a guard 41. The guard 41 is formed, at its periphery, with a channel shaped portion 42 which is of arcuate formation, and the guard is normally positioned, as shown in Figure 1, with the channel portion 42 encircling the lower portion of the saw blade 25. The cap member 30 is also formed with a cylindrical flange 43 arranged in concentrically spaced relation to the cylindrical portion 39, the flange and the portion 39 forming an annular recess 44.

The hub 40 is encircled by a torsion spring 46 having an end portion 47 fixed in the cap 30, and the opposite end portion 48 fixed in the hub 40. The spring 46 is positioned in the annular recess 44, the hub 40 forming an outer closure for the recess, whereby the spring is protected from the accumulation of dust and the like. The hub 40 is retained upon the cylindrical portion of the cap by a snap ring 50 detachably mounted in a groove formed in the cap.

With this arrangement, the hub 40, of the movable guard 41, is mounted over the bearing 29, with the result that the saw blade 25 is supported in close proximity to the bearing 29. This provides adequate support for the blade and avoids creating any undue load on the bearing, or any springing of the arbor shaft. The spring 46 functions to yieldingly maintain the guard in the protective position shown in Figure 1. As the saw is moved through the work piece to the right, Figure 1, the guard is engaged by the work piece and is moved in a clockwise direction upwardly within the inner and outer walls 23, 24, of the fixed guard 24. The movable guard is provided with a handle member 52 (see Fig. 4) positioned to move exteriorly of the fixed guard for the convenient manipulation of the movable guard if it is desired to manually move it out of protective position, as for changing the saw blade. The movable guard can be conveniently removed from the cap member, as for replacement of the spring 46, by simply removing the snap ring 50, the bore of the guard 40 being slightly greater than the diameter of the collar 34. This avoids dis-assembly of the arbor shaft structure.

What I claim is:

A power operated wood saw of the circular blade type, a motor housing, a motor mounted in the housing, a stationary guard fixedly secured to the housing and having an arcuate portion enclosing a first portion of the saw blade, said guard having a hub portion formed with a gear compartment, a bearing cap detachably secured to the guard hub, a bearing carried by said cap, an arbor shaft journalled in said bearing and having an outwardly extending end portion for supporting the circular blade, gearing mounted in said gear compartment and operatively connecting said motor to the arbor shaft, said cap being formed with a cylindrical portion encircling said bearing, said cap further having a cylindrical flange in spaced concentric relation to the cylindrical portion and forming with said cylindrical portion an annular channel, a movable guard having a hub portion rotatably mounted on said cylindrical portion of the cap and forming a seal for said annular channel, said movable guard having an arcuate channel shaped portion extending in concentrically spaced relation to the periphery of the saw blade, a torsion spring mounted in the annular channel and encircling the hub portion of said movable guard and being operable to yieldingly maintain the arcuate portion of said movable guard in position to encircle a second portion of the blade, said movable guard being rotatable about the cylindrical portion of said cap against the action of said spring to move the arcuate portion of the movable guard within said fixed guard.

References Cited in the file of this patent

UNITED STATES PATENTS

| | | |
|---|---|---|
| 1,900,553 | Hampton | Mar. 7, 1933 |
| 2,488,947 | Vavrik | Nov. 22, 1949 |
| 2,543,486 | Briskin | Feb. 27, 1951 |
| 2,544,461 | Leitzel | Mar. 6, 1951 |
| 2,693,207 | Berge | Nov. 2, 1954 |